United States Patent [19]

Shimizu et al.

[11] Patent Number: 5,249,091
[45] Date of Patent: Sep. 28, 1993

[54] DISK DRIVING APPARATUS HAVING LINKED HOLDER AND COVER

[75] Inventors: Hitoshi Shimizu; Yuichi Kurosawa, both of Tokyo, Japan

[73] Assignee: Asahi Kogaku Kogyo Kabushiki Kaisha, Tokyo, Japan

[21] Appl. No.: 546,856

[22] Filed: Jul. 2, 1990

[30] Foreign Application Priority Data

Jul. 7, 1989 [JP] Japan ................... 1-176771

[51] Int. Cl.⁵ .............................................. G11B 17/02
[52] U.S. Cl. ................................................ 360/99.06
[58] Field of Search ............... 360/99.02, 99.03, 99.06, 360/99.07; 369/270, 75.2

[56] References Cited

U.S. PATENT DOCUMENTS

| 4,758,909 | 7/1988 | Harase | 360/99.06 |
| 5,067,121 | 11/1991 | Einhaus | 369/75.2 |

FOREIGN PATENT DOCUMENTS

| 158360 | 10/1985 | European Pat. Off. |
| 189324 | 7/1986 | European Pat. Off. |
| 194138 | 9/1986 | European Pat. Off. |
| 0250111 | 12/1987 | European Pat. Off. |
| 3801697 | 8/1988 | Fed. Rep. of Germany |
| 1471292 | 4/1977 | United Kingdom |
| 1592922 | 7/1981 | United Kingdom |
| 2101391 | 1/1983 | United Kingdom |
| 2200239 | 7/1988 | United Kingdom |

Primary Examiner—Robert S. Tupper
Attorney, Agent, or Firm—Sandler Greenblum & Bernstein

[57] ABSTRACT

A disk driving apparatus comprising a holder having an insertion opening end through which a jacket having a disk therein is inserted and discharged, a cover from which the holder hangs, a body having a motor for driving the disk in the jacket, and an opening and closing mechanism provided between the body and the cover for opening and closing the cover. The opening and closing mechanism includes a four-lever linkage having first and second levers which are pivoted at their one end to the body by respective pivot shafts and at the opposite ends to the cover by respective pivot shafts.

13 Claims, 3 Drawing Sheets

DISK DRIVING APPARATUS HAVING LINKED HOLDER AND COVER

BACKGROUND OF THE INVENTION

1. Field of the Invention

The present invention relates to an apparatus for driving a disk, such as a floppy disk, and more precisely to an apparatus for moving a cover which supports a holder in which the disk is housed.

2. Description of Related Art

In a known driving apparatus of a magnetic disk which is used as a recording medium in an electronic still camera, a cover is rotatably supported at one end by an immovable supporting shaft on one side of a body having a spindle motor. A holder, in which a jacket having the magnetic disk incorporated therein is inserted (which will be referred to as a disk or a jacket hereinafter), hangs from the cover. The holder rotates and moves upwardly when the cover is rotated open, so that the insertion end of the holder opens. When the cover is closed after the disk is inserted in the holder through the insertion end, the disk is engaged by the spindle motor of the body with the help of a spring, which is provided between the cover and the holder to bias the holder toward the body.

In the disk driving apparatus as mentioned above, the holder must be spaced far from the spindle motor of the body to insert and remove the disk into and from the holder when the cover is in an open position. However, in a conventional disk driving apparatus in which the cover is rotated to open and close about the supporting shaft on one side of the body, it is necessary to provide a large angular displacement of the cover about the immovable supporting shaft in order to space the disk (holder) from the spindle motor. Namely, a free end of the cover largely projects from the body when the cover opens, resulting in a large disk driving apparatus. Also, there is a possibility that foreign matter will interfere with the projecting cover or the holder, thus resulting in breakage thereof.

SUMMARY OF THE INVENTION

The primary object of the present invention is to provide a disk driving apparatus in which the cover only slightly projects from the body in an open position of the cover.

In the prior art, the cover is pivoted to one side of the body by the immovable supporting shaft, so that the cover largely projects from the body when the cover opens, as mentioned above. Accordingly, in the present invention, the improvement is directed to an opening and closing mechanism of the cover to reduce the projection length of the cover in an open position.

To achieve the object mentioned above, according to the present invention, there is provided a disk driving apparatus comprising a holder having an insertion opening through which a jacket having a disk therein is inserted and discharged, a cover from which the holder hangs, a body having a motor for driving the disk in the jacket, and an opening and closing mechanism provided between the body and the cover for opening and closing the cover, wherein said opening and closing mechanism comprises a four-lever linkage having first and second levers which are pivoted at one end to the body and at the opposite ends to the cover.

The four-lever linkage causes the upward movement of the cover not only at the front portion thereof but also at the rear portion. The upward displacement of the front portion and the rear portion of the cover is determined in accordance with the lengths of the first and second levers. This makes it possible to space the holder which hangs from the cover, from the body by a decreased maximum length of projection of the cover from the body.

Preferably, the first and second levers are symmetrically located on the right and left side walls of the cover and the body, as viewed from the insertion opening end of the holder, to stably open and close the cover.

Preferably, a spring means is provided between the first and second levers for biasing the levers, so that the cover tends to separate from the body.

In a preferred embodiment of the invention, the front second levers are longer than the rear first levers, so that when the cover is opened, the front portion of the cover is located at a higher position than the rear portion of the cover.

To perform the opening and closing operation of the cover with a small forward and backward displacement thereof, the pivot shafts of the first and second levers on the body are located closer to the front ends of the body and the cover than the pivot shafts of the first and second levers on the cover, respectively.

According to another aspect of the present invention, a biasing means is provided between the cover and the holder for biasing the holder toward the body.

Furthermore, a restricting means can be provided between the cover and the holder for restricting the maximum distance therebetween.

Preferably, the restricting means comprises a front restricting means which comprises engaging legs provided on the cover, recesses provided on the upper sides of the the engaging legs, and pins which are provided on the holder which engage with corresponding recesses in the associated engaging legs, and a rear restricting means which comprises elongated holes formed in the holder and pins which are provided on the first levers or the second levers to engage in the corresponding elongated holes.

In a preferred embodiment of the present invention, the maximum distance between the holder and the cover at the front restricting means is larger than the maximum distance between the holder and the cover at the rear restricting means. This enables the holder to be kept in a substantially horizontal state, relative to the cover which is inclined in an open position wherein the front end of the cover is located higher than the rear end thereof.

BRIEF DESCRIPTION OF THE DRAWINGS

The invention will be described below in detail with reference to the accompanying drawings, in which.

DESCRIPTION OF THE PREFERRED EMBODIMENTS

Figure 1:
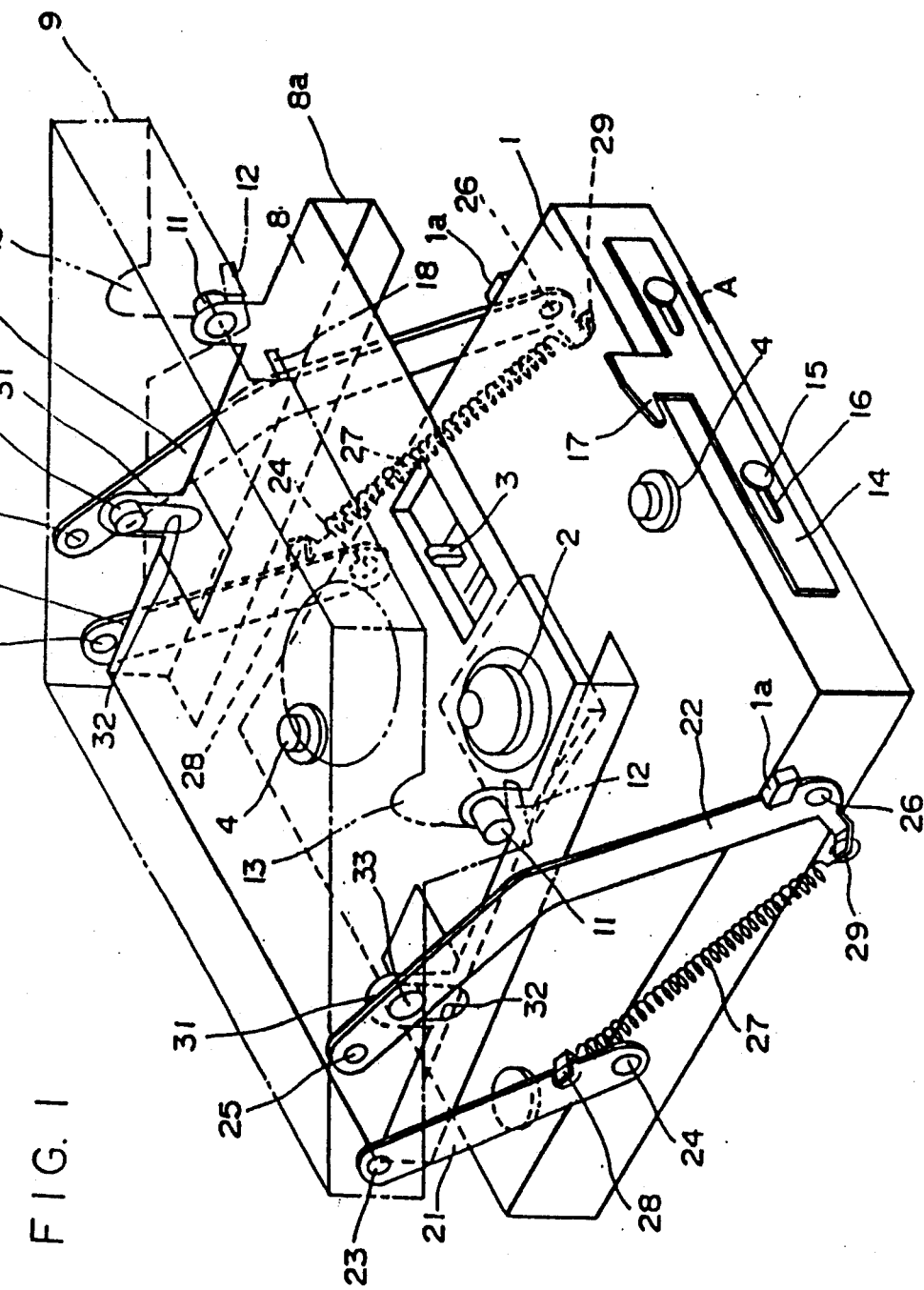
FIG. 1 is a perspective view of a disk driving apparatus with a cover and holder in an open position, according to an embodiment of the present invention.
Figure 2:
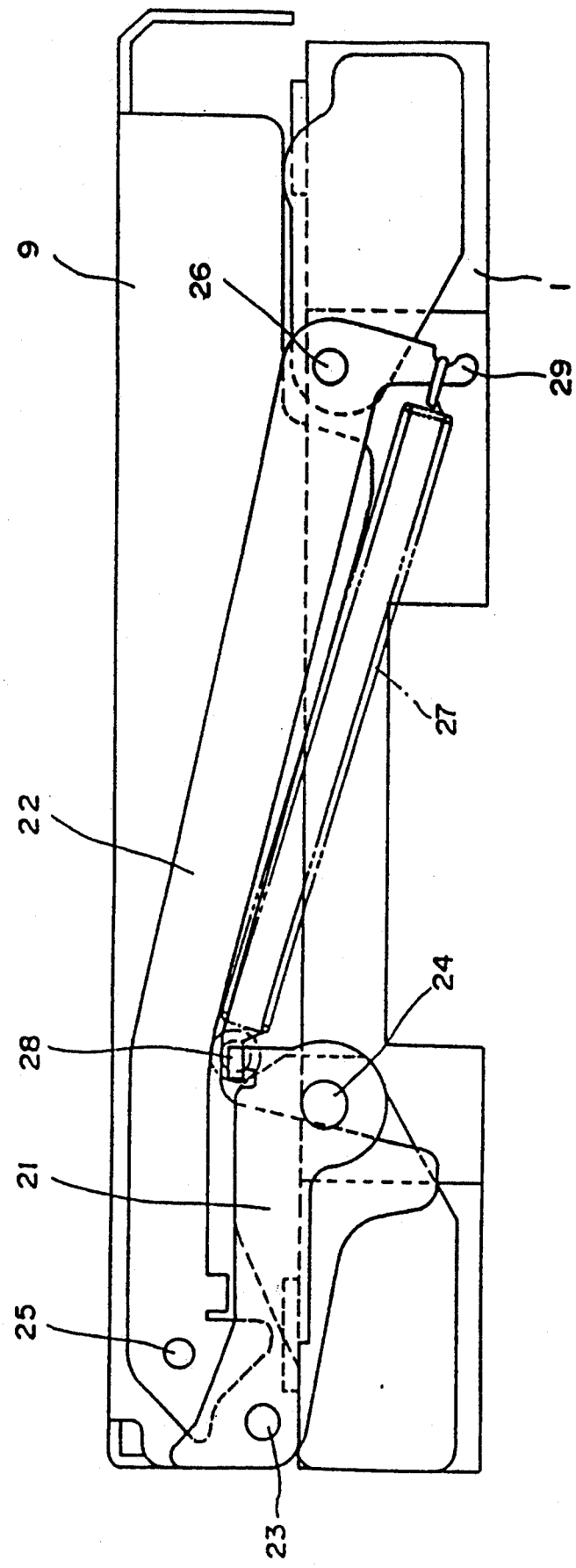
FIG. 2 is a side elevational view of the cover and a holder shown in FIG. 1, in a closed position thereof; and, FIGS. 3 and 4 are skeleton side sectional views of a cover and a holder shown in FIG. 1, in an open position and a closed position, respectively.

The disk driving apparatus of the invention has a body 1, a cover 9 which is attached to body 1 to open and close the apparatus and a holder 8 which hangs from the cover 9. The body 1 has a spindle motor 2, a record/play-back head 3, and a plurality of bosses 4 which position the disk, etc., as is well known.

The holder 8 which is generally of angular tubular shape with an open bottom is provided on its opposite sides with flat walls with horizontally extending pins 11 and upwardly extending projections 31 in which vertically elongated holes 32 are formed. The cover 9, which is slightly larger than holder 8, is provided on its side walls with engaging legs 12 which bear against the lower surfaces of the corresponding pins 11. The cover 9 has on its side walls, recesses 13, located above the engaging legs 12, to permit pins 11 to move upwardly. The engaging legs 12 and the pins 11 cause the holder 8 to move upwardly together with the cover 9 when cover 9 moves upwardly. Conversely, when the downward movement of holder 8 is restricted, cover 9 can move downwardly relative to holder 8 within the limits of movement defined by recesses 13.

Between the side walls of body 1 and cover 9 are symmetrically a set of first and second link levers 21 and 22 are symmetrically provided and are pivoted to corresponding side walls of body 1 and cover 9. Namely, the first link levers 21 are pivoted at their lower ends to the opposite side walls of body 1 by pivot shafts 24, and at their upper ends to the opposite side walls of the cover 9 by pivot shafts 23. Similarly, the second link levers 22 are pivoted at their lower ends to the opposite side walls of body 1 by pivot shafts 26 and at their upper ends to the opposite side walls of cover 9 by pivot shafts 25. The first and second levers 21 and 22 form a known four-lever rotating linkage. In the four-lever linkage in the illustrated embodiment, if the insertion open end 8a of holder 8 is a front end, the front second levers 22 are longer than rear first levers 22. The lower shafts 24 and 26 of first and second levers 21 and 22, adjacent to the body 1, are located closer to the front end of body 1 than upper shafts 23 and 25 of first and second levers 21 and 22, so that levers 21 and 22 are vertically inclined, as viewed in the side elevation.

Tensile springs 27 are provided between spring abutments 28 which are formed at the intermediate portions of the first lever 21 and spring abutments 29 which are formed at the lower ends of second levers 22, located below the shafts 26. The tensile springs 27 bias link levers 21 and 22, so that cover 9 tends to separate from body 1 toward the open position. The amount of rotational movement of cover 9 is restricted by stops 1a which are provided on the body 1 and engage with associated second levers 22.

On the upper and inner surfaces of second levers 22 pins 33 are formed which are fitted in corresponding elongated holes 32 of holder 8. Consequently, when the second levers 22 rotate to move cover 9 upwardly toward the open position, the pins 33 come to the upper ends of elongated holes 32 to move holder 8 upwardly, and holder 8 hangs from the cover 9. When second levers 22 are rotated in the reverse direction, the pins 33 move downward in the associated elongated holes 32 after the downward movement of the holder 8 is restricted.

Figure 3:
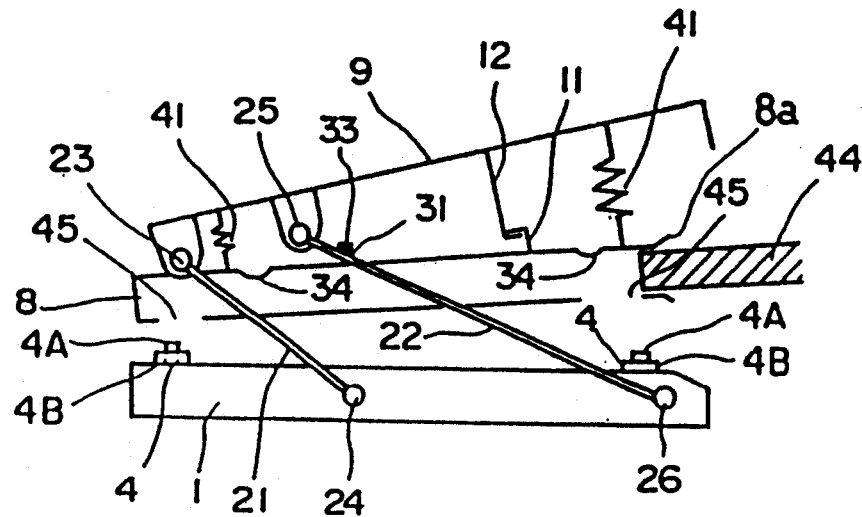
Figure 4:
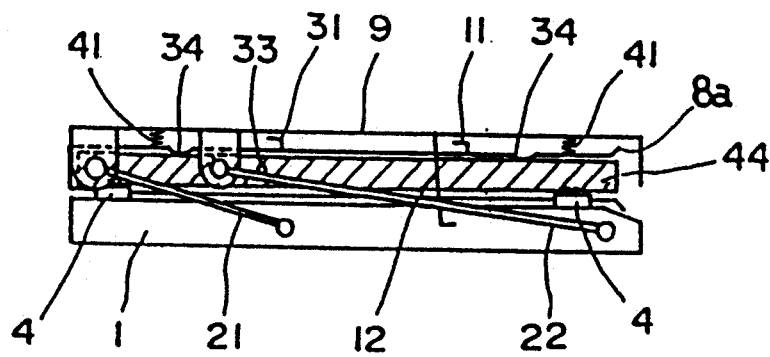

As illustrated in FIGS. 3 and 4, a plurality of compression springs 41 are provided between the inner surfaces of cover 9 and holder 8. The compression springs 41 are connected to cover 9 and holder 8 at the upper and lower ends thereof, respectively. Compression springs 41 bias the holder 8 downwardly relative to cover 9.

The holder 8 has inner projections 34 on the upper wall thereof to press down the (magnetic disk) jacket 44 inserted therein. On the lower side walls of holder 8 are formed through holes 45 which the corresponding positioning bosses 4 of the body 1 are engaged with jacket 44. The jacket 44 has a hard case which contains a magnetic disk and which has holes (not shown) in which the corresponding positioning bosses 4 are engaged.

As shown in FIG. 1, body 1 has on its front face a slide lock plate 14 having laterally elongated holes 16. Pins 15 provided on body 1 are fitted in elongated holes 16, so that slide lock plate 14 can move relative to body 1 within an effective range of the length of elongated holes 16. The slide lock plate 14 has an upwardly extending hook 17 which is disengageably engaged by a locking projection 18 provided on cover 9. The slide lock plate 14 is continuously biased in the direction A toward an engagement position in which hook 17 is engaged by locking projection 18.

In the disk driving apparatus as constructed above, when jacket 44 is inserted in holder 8 in an open position of cover 9, as shown in FIG. 1, the shutter (not shown) provided in jacket 44 is opened. As is well known, the shutter is placed at a position corresponding to magnetic head 3, so that the magnetic disk within jacket 44 can be brought into contact with magnetic head 3. When cover 9 is pushed down, the first and second levers 21 and 22 rotate in the counterclockwise direction about shafts 24 and 26 against tensile springs 27, as shown in FIG. 1. Since holder 8 is biased downwardly by compression springs 41, the pins 11 of holder 8 engage with engaging legs 12 of cover 9, so that when pins 33 come into contact with the upper ends of the associated elongated holes 32, the holder 8 moves downward together with cover 9.

A further downward movement of cover 9 causes bosses 4 to engage into the corresponding holes 45 of holder 8, so that the lower surface of jacket 44 comes into contact with base portions 4B of the bosses 4. As a result, the projections 4A of bosses 4 are inserted in the positioning holes of jacket 44. The disk in the jacket 44 is located above spindle motor 2.

During further downward movement of cover 9, when the projections 34 of holder 8 come into contact with jacket 44, holder 8 stops. Namely, the lower extremity of the downward movement of holder 8 is restricted. Thereafter, only cover 9 moves downwardly to compress compression springs 41. Namely, holder 8 and jacket 44 held thereby are elastically pressed toward the spindle motor 2. After the lower extremity of movement of the holder 8 is restricted, pins 33 move downwardly in the associated elongated holes 32, and engaging legs 12 move away from the pins 11 to move in the recesses 13.

When cover 9 is completely closed, the locking projection 18 is engaged by hook 17 of the slide lock plate 14 to lock cover 9. In this locked position, when spindle motor 2 is rotated, the disk rotates in jacket 44, so that data is recorded on the disk or the data recorded on the disk is reproduced (played-back).

Thereafter, when slide lock plate 14 is moved in a direction opposite to the direction A (FIG. 1) to disengage hook 17 from locking projection 18 of cover 9, the first and second link levers 21 and 22 are rotated in a clockwise direction by the spring force of tensile springs 27 and compression springs 41 until the second link levers 22 come into contact with stop projections 1a of body 1. The rotational movement of the first and second levers 21 and 22 causes cover 9 to move upward through shafts 23 and 25, so that holder 8 which is connected to cover 9 by compression springs 41, also moves upwardly. The front portion of holder 8 moves together with cover 9 after engaging legs 12 come into engagement with associated pins 11, and the rear portion of holder 8 moves together with cover 9 after pins 33 come to the upper ends of the associated elongated holes 32.

In the open position of the cover 9, not only the front portion of cover 9, but also the rear portion thereof moves upwardly relative to body 1. Since the second levers 22 are longer than first levers 21, the upward displacement of the front portion of the cover is larger than that of the rear portion thereof. The length of recesses 13 of cover 9 in the vertical direction is longer than the length of elongated holes 32, and accordingly, the inclination of holder 8 is smaller than the inclination of cover 9. That is, the holder 8 lies in a plane closer to the horizontal plane than a plane in which cover 9 lies when in the open position. Therefore, even if the length of projection of the cover 9 from the body 1 is small, particularly the length of projection of the front portion thereof in the upward direction, the jacket 44 in holder 8 can be spaced from the positioning bosses 4 of body 1, and accordingly, it is possible to insert and remove jacket 44 into and from the insertion opening 8a of holder 8 substantially in a horizontal state.

This becomes clearer particularly in comparison with the prior art in which cover 9 rotates about an immovable supporting shaft provided on the rear portion of body 1. In the prior art, it is necessary to provide a large upward displacement of cover 9 in order to space the rear portion of jacket 44 from the positioning bosses 4. On the contrary, in the present invention, it is possible to space jacket 44 from the bosses 4 without increasing the length of projection of the cover 9 from body 1. Furthermore, since shafts 24 and 26 of the first and second link levers 21 and 22 on body 1 are located closer to the front end of the apparatus than the shafts 23 and 25 on cover 9, respectively, a smaller component of the displacement of cover 9 in the forward and backward directions causes the necessary displacement of the cover in the upward and downward directions, upon opening and closing the cover.

In addition to the foregoing, since holder 8 (and accordingly jacket 44) can be moved upwardly, while keeping a substantially horizontal state, play of the jacket 44 in holder 8 can be made small. This makes it possible to press jacket 44 toward body 1 by springs 41 through the projections 34 provided on the inner face of holder 8 in a closed position of cover 9. Note that in the prior art in which the cover rotates about an immovable supporting shaft, it is necessary to provide a large play of the jacket in the holder, and accordingly, it is necessary to provide an additional spring on the cover to press the jacket downwardly when the cover is closed. Such an additional spring can be dispensed with, in the present invention.

We claim:

1. A disk driving apparatus comprising a holder having an insertion opening through which a jacket having a disk therein is inserted and discharged, a cover and means for attaching said holder to said cover for movement with respect to said cover in a direction generally transverse to the plane of the disk, a body having a motor for driving the disk in the jacket, and an opening and closing mechanism provided between the body and the cover for opening and closing the cover, wherein said opening and closing mechanism comprises a four-lever linkage having first and second levers which are pivoted at their one end to the body by respective pivots shafts and at the opposite ends to the cover by respective pivot shafts, said first and second levers are symmetrically located on the right and left side wall of said cover and said body, as viewed from the direction of the insertion opening end of the holder, said first and second levers comprising rear and front levers and said insertion opening end is at a front end of said holder, and said second levers are longer than said first levers, whereby a front portion of said cover opens more than a rear portion of said cover and said pivot shafts of said first and second levers on said body are located closer to the front end of said body than said pivot shafts of said first and second levers on said cover, whereby said first and second levers are inclined with the respect to a vertical.

2. The disk driving apparatus according to claim 1, further comprising spring means between said first and second levers for biasing said levers, so that said cover tends to separate from the body.

3. The disk driving apparatus according to claim 1, further comprising a biasing means between said cover and said holder for biasing said holder toward said body.

4. The disk driving apparatus according to claim 3, further comprising a restricting means between said cover and said holder for restricting the maximum open distance therebetween.

5. A disk driving apparatus according to claim 4, wherein said restricting means for restricting the maximum open distance between said cover and said holder comprises front restricting means which comprises engaging legs provided on said cover, recesses provided on the upper side of said engaging legs, and pins which are provided on said holder to engage with said recesses provided on said engaging legs, and rear restricting means which comprises elongated holes formed in said holder and pins which are provided on said first levers or said second levers to engage in said corresponding elongated holes.

6. The disk driving apparatus according to claim 5, wherein the maximum open distance between said holder and said cover is defined by the front restricting means is larger than the maximum distance between said holder and said cover is defined by the rear restricting means.

7. The disk driving apparatus according to claim 6, wherein said first and second levers are symmetrically located on the right and left side walls of said cover and said body, as viewed from the direction of the insertion opening end of said holder.

8. The disk driving apparatus according to claim 7, wherein said first and second levers are rear and front levers, and said insertion opening end is a front end of said holder.

9. The disk driving apparatus according to claim 8, wherein said holder lies in a plane substantially parallel with a plane in which said body lies when said cover is in an open position.

10. The disk driving apparatus according to claim 1, wherein said holder is provided on its upper inner surface with projections which come into contact with the jacket inserted in said holder for pressing the jacket.

11. The disk driving apparatus according to claim 10, wherein said projections provided on the upper inner surface of said holder come into elastic contact with the jacket inserted in said holder for pressing the jacket.

12. A disk driving apparatus comprising a pair of front and rear levers which are pivoted at lower ends of said levers to opposite side walls of a body which has a motor for driving a disk, and at upper ends of said levers to a cover, said levers being capable of swinging between a position in which the cover is placed on the body and a position in which the cover is spaced from the body and a holder which is supported by said cover and means mounting said holder for movement with respect to said cover, to hold a jacket having a disk therein, said disk driven to rotate by the motor, said levers comprising means for spacing said cover from said body such that displacement of a front portion of said cover is larger than that of a rear portion of said cover and that the inclination of said holder is smaller than the inclination of said cover.

13. The disk driving apparatus according to claim 12, further comprising means for restricting the maximum open distance between said cover and said holder, said restricting means comprising front restricting means and rear restricting means, wherein a maximum distance between said holder and said cover defined by said front restricting means is larger than a maximum distance between said holder and said cover defined by said rear restricting means.

* * * * *